United States Patent [19]

Kim et al.

[11] Patent Number: 5,802,022
[45] Date of Patent: Sep. 1, 1998

[54] DISK CHANGER FOR CHECKING THE POSITION OF DISKS ON A ROULETTE WITHOUT DRAWING A TRAY OUT OF THE DISK CHANGER

[75] Inventors: Chang Seok Kim; Seong Yeon Park, both of Suwon; Jae Hyun Yoon, Seoul; Ho Han Ryu, Kyunggi-do, all of Rep. of Korea

[73] Assignee: Samsung Electronics Co., Ltd., Kyungki-Do, Rep. of Korea

[21] Appl. No.: 805,719

[22] Filed: Feb. 25, 1997

[30] Foreign Application Priority Data

Feb. 29, 1996 [KR] Rep. of Korea ............... 96-5316
Feb. 29, 1996 [KR] Rep. of Korea ............... 96-5320

[51] Int. Cl.⁶ .......................... G11B 17/00; G11B 33/02
[52] U.S. Cl. ........................ 369/37; 369/75.1; 369/75.2
[58] Field of Search ...................... 369/37, 75.1, 75.2, 369/77.1, 77.2, 292

[56] References Cited

U.S. PATENT DOCUMENTS

| | | | |
|---|---|---|---|
| 3,784,211 | 1/1974 | Summerfield | 369/65 |
| 4,484,239 | 11/1984 | Timm | 360/92 |
| 4,673,994 | 6/1987 | Hida | 360/85 |
| 5,197,057 | 3/1993 | Iyama et al. | 369/37 |
| 5,528,567 | 6/1996 | Kim | 369/37 |
| 5,631,884 | 5/1997 | Chun | 369/37 |

FOREIGN PATENT DOCUMENTS

| | | |
|---|---|---|
| 55-132505 | 10/1980 | Japan . |
| 57-181401 | 11/1982 | Japan . |
| 1-086392 | 3/1989 | Japan . |
| 2-031371 | 2/1990 | Japan . |
| 2-2232859 | 9/1990 | Japan . |
| 3-023581 | 1/1991 | Japan . |
| 4-023291 | 1/1992 | Japan . |
| 4-4044662 | 2/1992 | Japan . |
| 4-274079 | 9/1992 | Japan . |
| 6-119771 | 4/1994 | Japan . |
| 7-220461 | 8/1995 | Japan . |

*Primary Examiner*—Stuart S. Levy
*Assistant Examiner*—William J. Klimowicz
*Attorney, Agent, or Firm*—Sughrue, Mion, Zinn, Macpeak & Seas, PLLC

[57] ABSTRACT

A disk changer in which it is possible to check the position of disks seated on a roulette inside the disk changer without drawing out a tray from the disk changer, the roulette moving with the tray and being disposed below the tray. The disks seated on the roulette can be seen through viewing holes in a top cover of a housing of the disk changer, the viewing holes in the top cover being aligned with holes in the tray when the tray is disposed inside the housing of the disk changer.

3 Claims, 6 Drawing Sheets

DISK CHANGER FOR CHECKING THE POSITION OF DISKS ON A ROULETTE WITHOUT DRAWING A TRAY OUT OF THE DISK CHANGER

BACKGROUND OF THE INVENTION

1. Field of the Invention

The present invention relates to a disk changer having a tray and a roulette, and more particularly to a disk changer for checking the position of disks seated on the roulette without having to draw the tray out of the disk changer.

2. Description of the Prior Art

In a disk changer having a tray on which a generally large radius disk rests and a roulette on which at least two generally small radius disks rest, the roulette is disposed underneath the tray so that the overall size of the disk player can be reduced. In this type of disk changer, the tray is transferred back and forth from a turn table installed in a housing for loading and unloading a selected disk. The roulette swivels left or right with respect to the turn table when one of the generally small radius disks seated on the roulette needs to be loaded or unloaded. After recording or play back, the roulette is positioned in its normal position with the tray being disposed in its closed position.

In the above type of disk changer, it is impossible to determine the location of the disks on the roulette, and whether one or more of the positions on the roulette are empty, unless the tray is drawn out of the disk changer.

Thus, there is a need for a disk changer in which the position of disks seated on the roulette can be determined without drawing out the tray from the disk changer.

SUMMARY OF THE INVENTION

An object of the present invention is to provide a disk changer in which it is possible to check the position of disks seated on a roulette without drawing a tray out from the disk changer.

In one embodiment of the invention, this object is obtained by providing a disk changer comprising:

a housing including a top cover;

a tray disposed for movement in and out of said housing, said tray having an opening substantially in a center of said tray;

a roulette supported below said tray, said roulette having at least two disk receiving portions each for supporting a disk, said roulette being disposed to rotate under the tray to load and unload a selected disk, wherein said top cover has a viewing hole which is substantially aligned with the opening in said tray and at least one of said disk receiving portions of said roulette when said tray is disposed inside said housing and said roulette is in a predetermined position.

In another embodiment of the invention, the above object is obtained by providing a disk changer comprising:

a housing including a top cover;

a tray disposed for movement in and out of said housing, said tray having an opening substantially in a center of said tray and at least one hole to one side of the opening;

a roulette supported below said tray, said roulette having at least two disk receiving portions each for supporting a disk, said roulette being disposed to rotate under the tray to load and unload a selected disk, wherein said top cover has at least one viewing hole which is substantially aligned with said at least one hole in said tray when said tray is disposed inside said housing, and wherein one of said disk receiving portions of said roulette is aligned with said at least one viewing hole in said top cover and said at least one hole in said tray when said tray is disposed inside said housing and said roulette is in a predetermined position.

With this construction, it is possible to determine the position of disks on the roulette without drawing the tray out of the disk changer. It is also possible to determine which disk receiving portions on the roulette, if any, are empty, i.e., do not contain a disk.

DETAILED DESCRIPTION OF THE PREFERRED EMBODIMENTS

Figure 1:
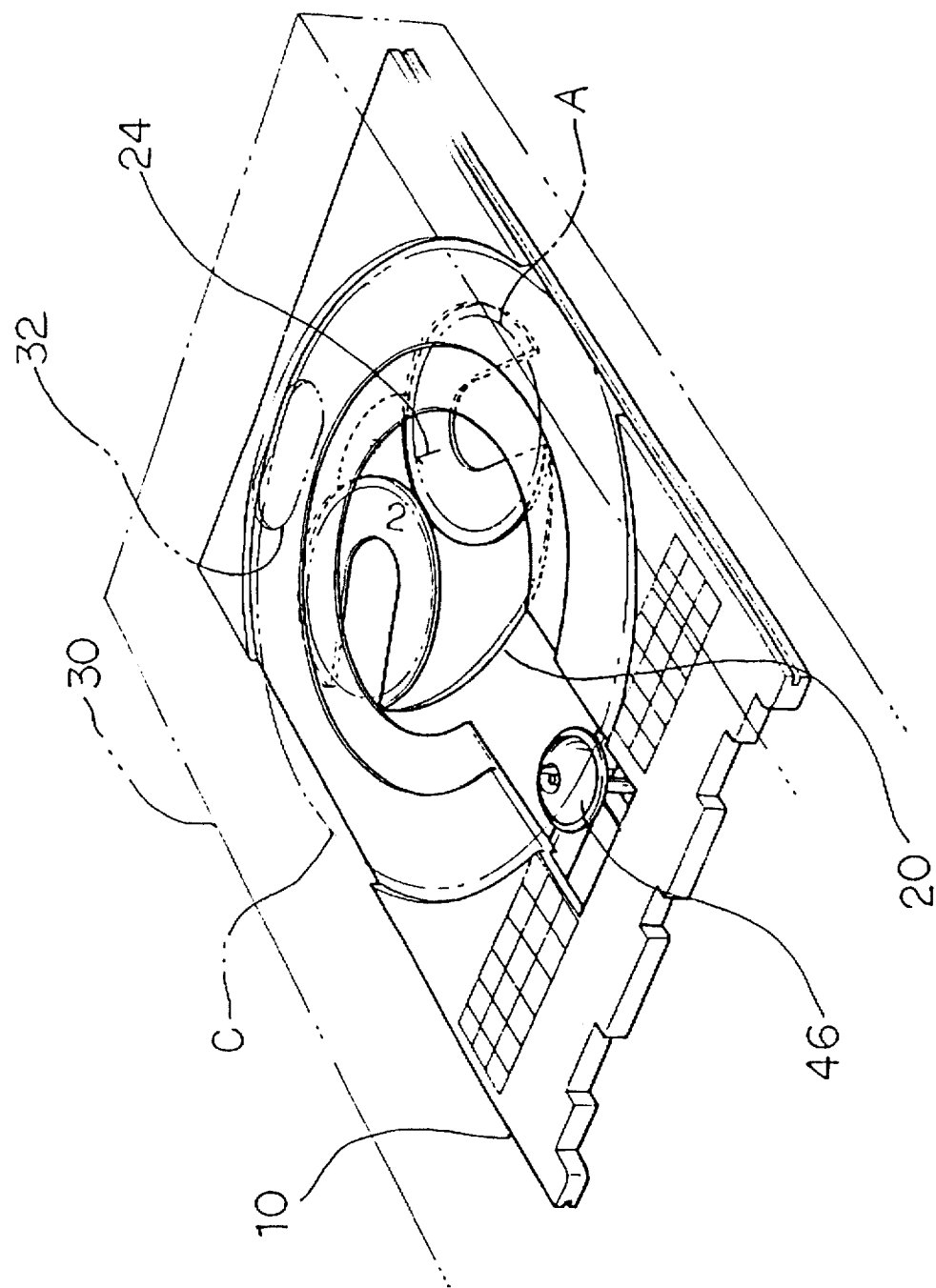
FIG. 1 is a perspective view of part of a disk changer according to a preferred embodiment of the present invention.
Figure 3:
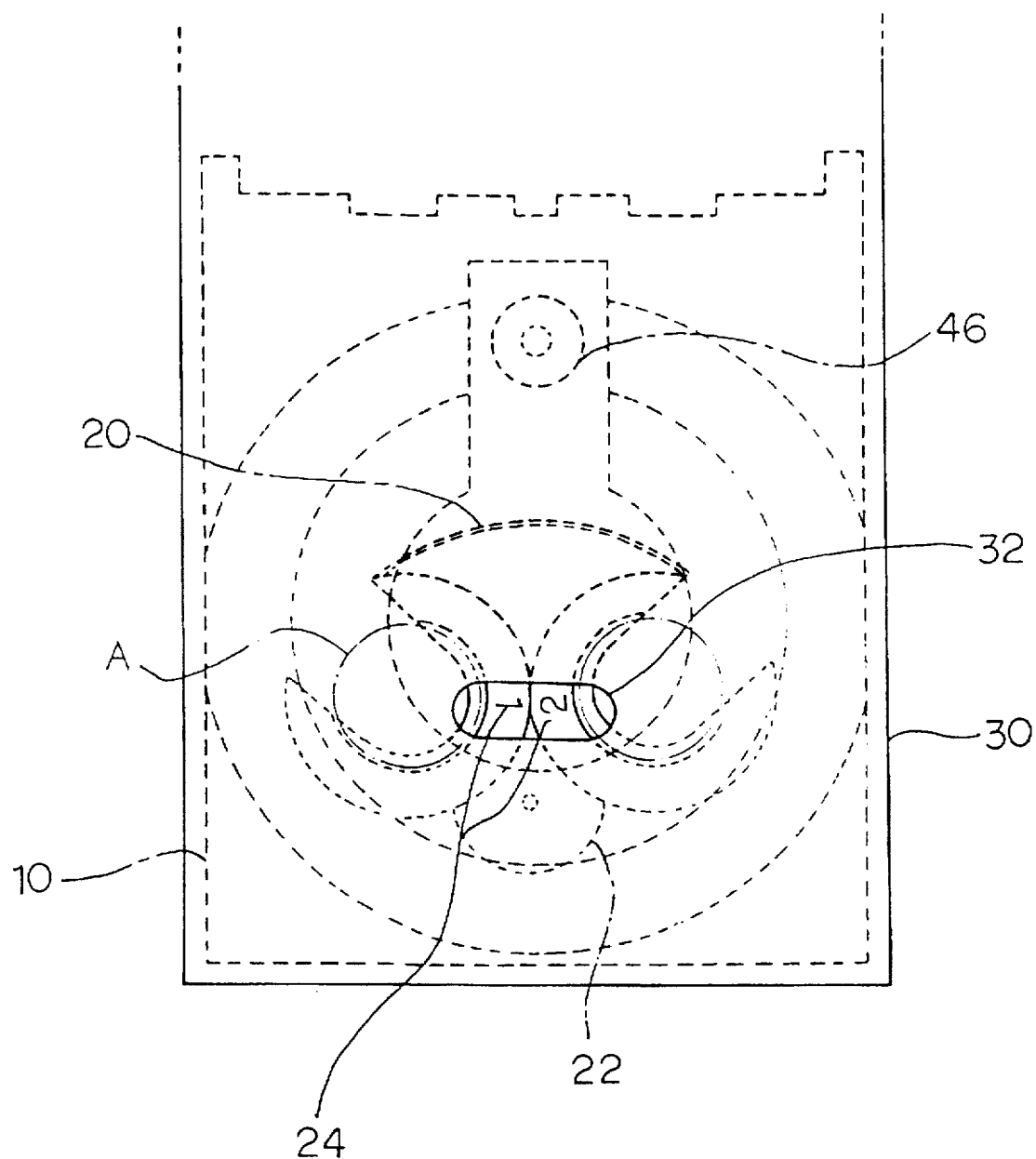
FIG. 3 is a plan view of the same device shown in FIG. 1.

FIGS. 1 and 3 show a disk changer having a top cover 30 with a viewing hole 32 according to a preferred embodiment of the present invention.

A generally large radius disk "C" can be seated on the tray 10. The roulette 20 is positioned beneath the tray 10. At least two generally small radius disks "A" can be seated on the roulette 20. The top cover 30 is disposed over the tray 10 when the tray is disposed inside the disk changer housing. The viewing hole 32 is for checking whether or not the generally small radius disks "A" are seated on the roulette 20.

Figure 2:
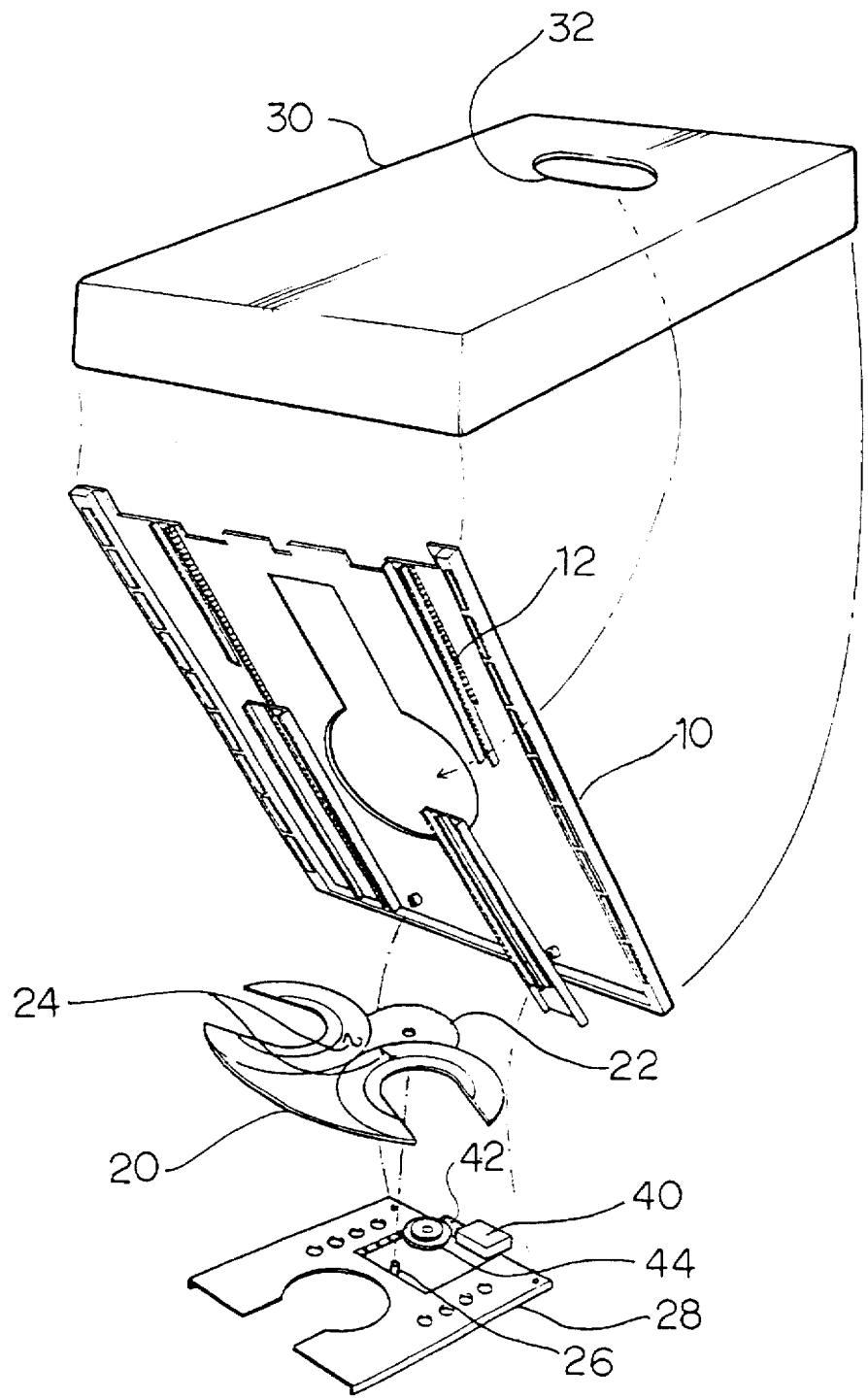
FIG. 2 is an exploded view of the same device shown in FIG. 1.

As indicated by the arrow in FIG. 2, when the tray 10 is disposed inside the disk player, the viewing hole 32 is substantially aligned with the opening in the center of the tray 10, so that the disk receiving portions of the roulette 20 can be seen through the viewing hole 32 and the opening in the tray 10. If the viewing hole 32 is large enough or if it is shaped appropriately (see FIG. 3), two adjacent disk receiving portions of the roulette 20 can be viewed at the same time.

The roulette 20 is pivotally supported by a pivot pin 26 provided in a bracket 28. A gear 22 for swiveling the roulette 20 is formed at one side of the roulette 20 integrally therewith. A swivel motor 40 has a driving gear 42 engaged with a driven gear 44 which, in turn, is engaged with the gear 22 of the roulette 20. Racks 12 are formed at the bottom of the tray 10. The racks 12 are engaged with a pinion driven by a transfer motor (not shown) for transferring the tray 10 backward and forward with respect to a turn table 46.

A number 24, a letter, or some other distinguishing mark may be formed on each one of the disk receiving portions of roulette 20 to identify an empty disk receiving portion.

Figure 4:
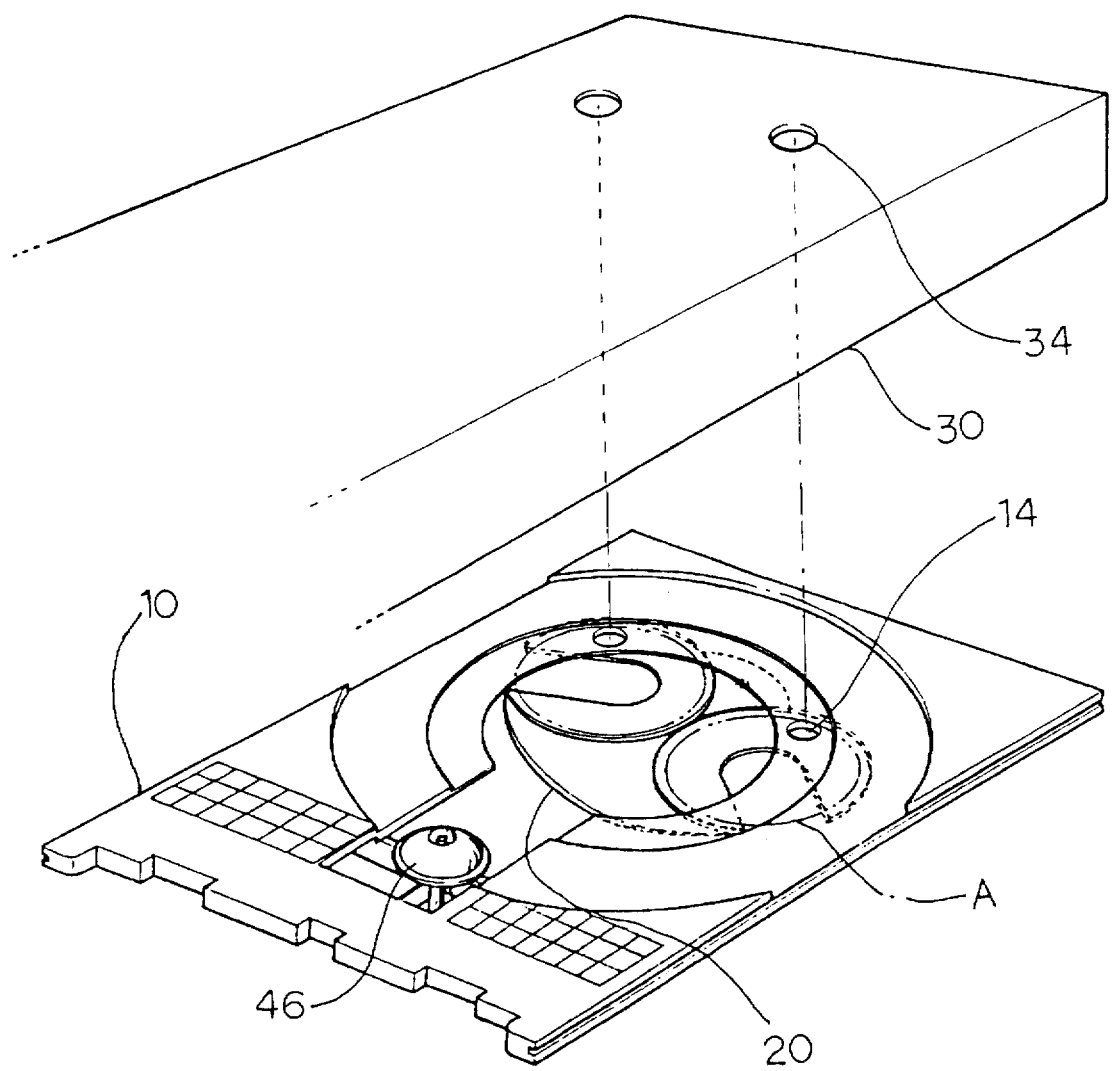
FIG. 4 is a perspective view of part of a disk changer according to another preferred embodiment of the present invention.
Figure 5:
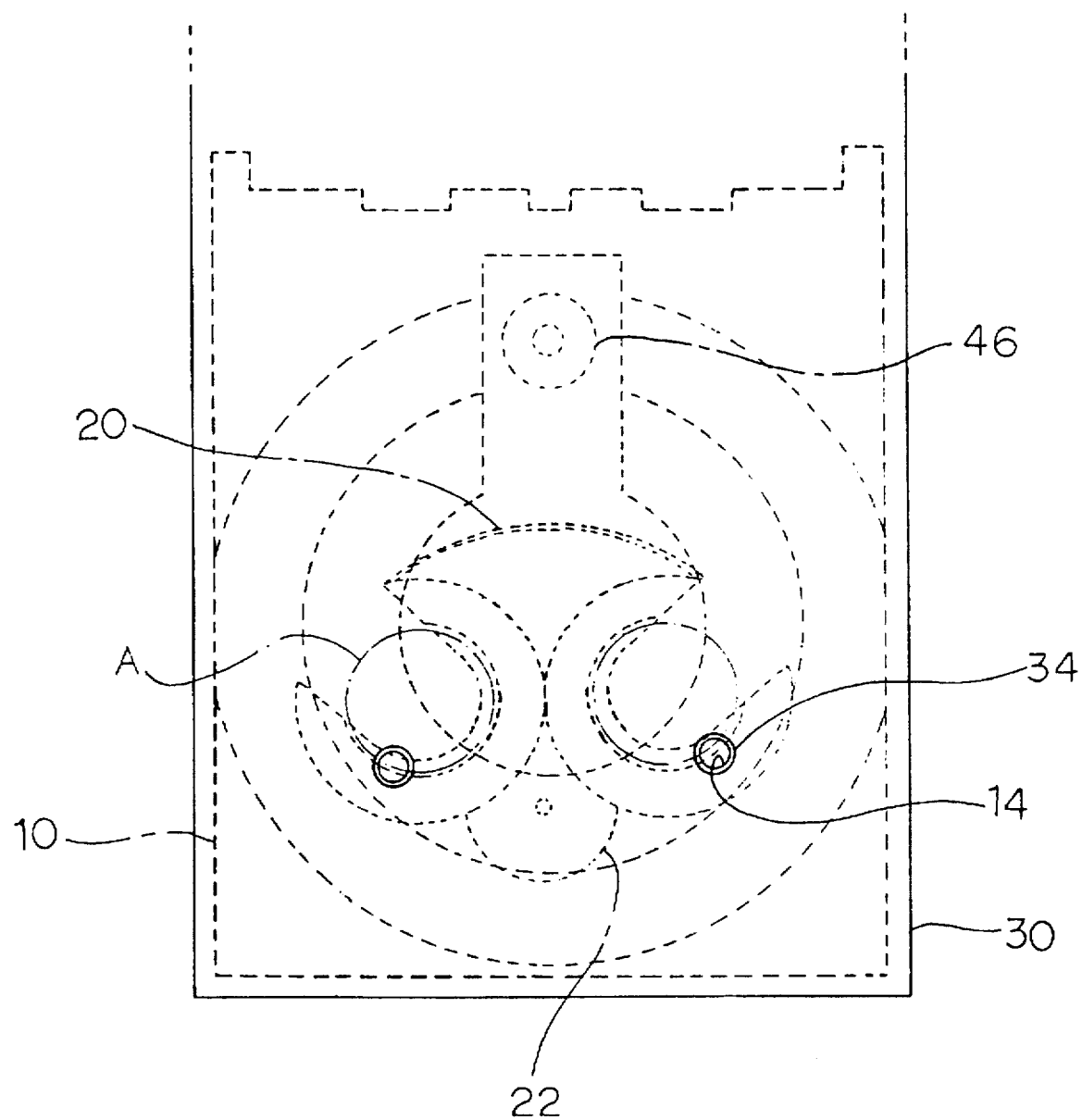
FIG. 5 is a plan view of the device shown in FIG. 4.

FIGS. 4 and 5 illustrate a disk changer according to another preferred embodiment of the invention.

Figure 6:
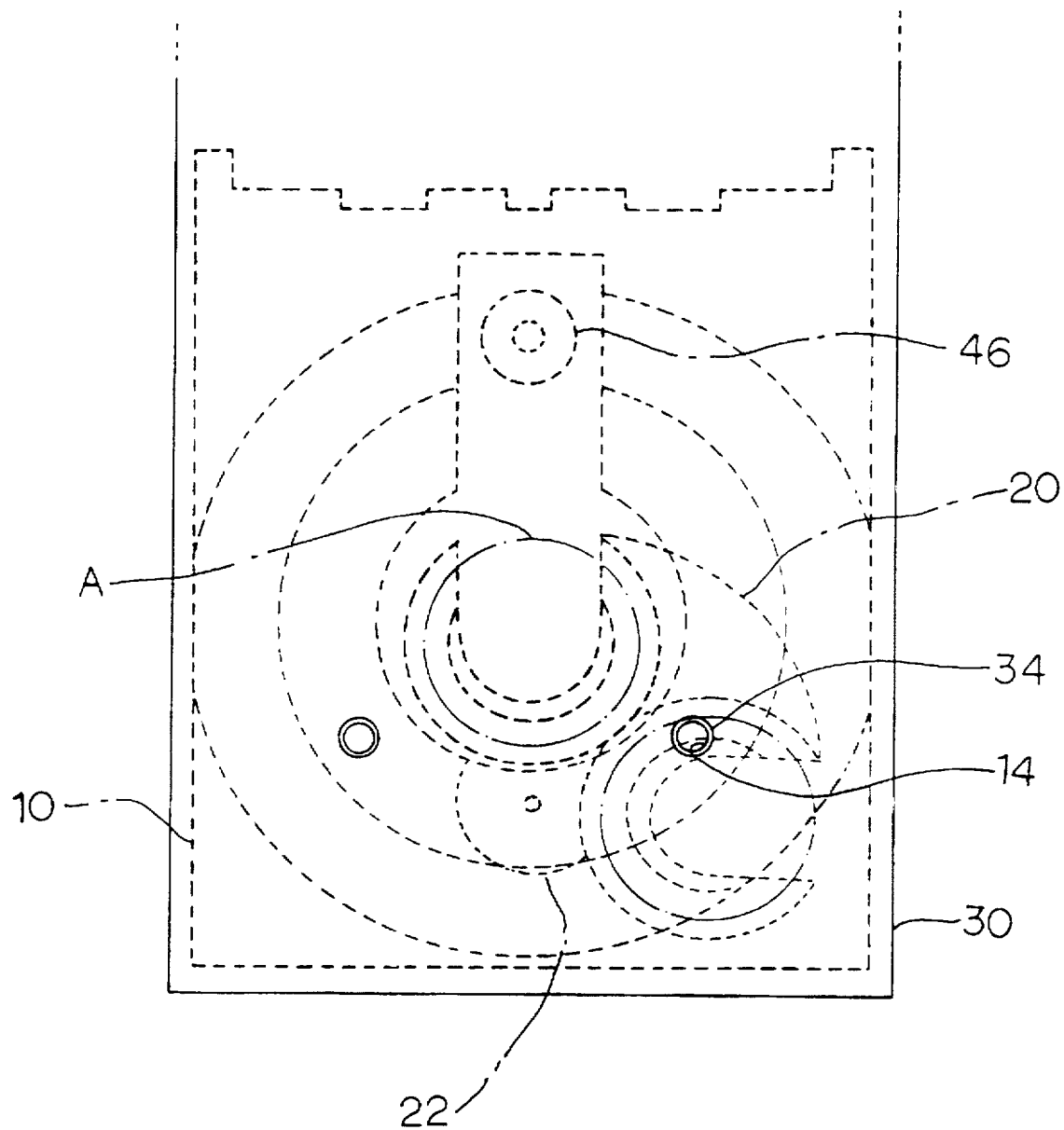
FIG. 6 is a plan view of the device shown in FIG. 4, wherein the roulette is swiveled to the right.

In this embodiment, the top cover 30 has two viewing holes 34, and two corresponding holes 14 are formed in the tray 10 to one side of the opening in the center of the tray. The viewing holes 34 are aligned with the holes 14 when the tray is disposed inside the disk changer. One or more of the disk receiving portions in the roulette 22 can be seen through respective holes 14 in the tray and viewing holes 34 in the top cover 30 when the tray is disposed inside the disk changer and the roulette is at a predetermined position. In FIG. 5, two disk receiving portions are aligned with respective ones of the holes 14 and 34. In FIG. 6, only one disk receiving portion is aligned with the holes 14, 34.

In both of the preferred embodiments, the holes in the top cover 30 and the tray 10 can be made large enough so that the disk receiving portions can be viewed clearly even if the roulette swivels to the left or right.

A generally transparent member may be provided to cover the holes 32, 34, and 14, respectively, in order to protect the disk player.

In summary then, it is possible to check the presence and location of the disks on the roulette without drawing out the tray from the disk player, which makes it more convenient for another disk to be selected or to be replaced.

It is understood that the foregoing description is only illustrative of the preferred embodiments of the invention. Various alternatives and modifications can be devised by those skilled in the art without departing from the invention. Thus, the present invention is intended to cover all such alternatives and modifications which fall within the scope of the appended claims.

What is claimed is:

1. A disk changer in which it is possible to check the position of disks seated on a roulette without drawing a tray out from the disk changer, said disk changer comprising:

a housing including a top cover;

a tray disposed for movement in and out of said housing, said tray having an opening substantially in a center of said tray and at least one hole to one side of the opening;

a roulette supported below said tray, said roulette having at least two disk receiving portions each for supporting a disk, said roulette being disposed to rotate under the tray to load and unload a selected disk, wherein said top cover has at least one viewing hole which is substantially aligned with said at least one hole in said tray when said tray is disposed inside said housing, and wherein one of said disk receiving portions of said roulette is aligned with said at least one viewing hole in said top cover and said at least one hole in said tray when said tray is disposed inside said housing and said roulette is in a predetermined position.

2. A disk changer as recited in claim 1, wherein there are two viewing holes in said top cover and two holes in said tray, and wherein two disk receiving portions can be seen through respective ones of said viewing holes in said top cover and said holes in said tray when said tray is disposed inside said housing.

3. A disk changer as recited in claim 1, wherein said disk receiving portions have distinguishing marks that can be seen through the at least one viewing hole for identifying an empty disk receiving portion.

* * * * *